Patented Nov. 7, 1939

2,178,737

UNITED STATES PATENT OFFICE 2,178,737

PROCESS FOR HYDROHALOGENATION OF VINYLACETYLENE

Wallace H. Carothers, deceased, late of Wilmington, Del., by Wilmington Trust Co., Wilmington, Del., executor, and Arnold M. Collins, Wilmington, Del., assignors to E. I. du Pont de Nemours and Company, Wilmington, Del., a corporation of Delaware No Drawing. Application October 15, 1937, Serial No. 169,192

16 Claims. (Cl. 260—655)

This invention relates to the hydrohalogenation of unsaturated hydrocarbons and more particularly to a continuous process for reacting hydrogen chloride with vinylacetylene.

This application is a continuation-in-part of applicants' copending application, Serial No. 688,030, filed September 2, 1933, which has now matured into U. S. Patent No. 2,102,611, issued December 21, 1937, and through it of applicants' prior application, Serial No. 490,538, filed October 22, 1930, which latter application is now U. S. Patent No. 1,950,431, issued March 13, 1934.

In the earlier cases, referred to above, is taught the making of mono- and di-hydrohalogen addition products of vinylacetylene. Briefly, this is preferably accomplished by the addition of hydrogen halides to vinylacetylene by bringing the reactants together in the presence of a catalyst such as cuprous chloride. Using the hydrogen chloride reaction as an example, and under the reaction conditions described in the earlier cases, the principal products are 2-chloro-1,3-butadiene and 2-4-dichloro-2-butene. The ratio in which these products are formed depends upon the conditions of the reaction. While both of the prior applications describe broadly the continuous process of the present application, neither of them is directed to such process specifically. Patent No. 1,950,431 is directed broadly to the mono-halogen-butadienes, the process of making them and a certain specific embodiment. Application Serial No. 688,030 is directed broadly to the di-halogen-butenes, the process of making them and a certain specific embodiment.

It is not unknown to react hydrogen halides of the group consisting of hydrogen chloride and hydrogen bromide with vinylacetylene by a continuous process. One such process is described in U. S. Patent No. 1,950,434, issued to Carter, Downing and Hutton. In the process there described, the products are removed in the vapor phase by sweeping out with excess vinylacetylene, which latter may then be separated from the products and recirculated. This process is characterized by low production per cycle of the vinylacetylene addition products.

An object of this invention is a continuous process of reacting hydrogen halides of the group consisting of hydrogen chloride and hydrogen bromide with vinylacetylene to obtain high production of addition products during a single contact period of the reactants. Further objects will appear hereinafter.

These objects have been accomplished by distributing vinylacetylene in finely divided form in an aqueous solution of a hydrogen halide of the group consisting of hydrogen chloride and hydrogen bromide, preferably in the presence of a catalyst such as the corresponding cuprous halide, at a temperature below the boiling point of the lowest boiling addition product. The addition products are allowed to rise by gravity and form a liquid layer above the aqueous solution, and are drawn off. The invention will hereinafter be discussed with reference to hydrogen chloride addition products of vinylacetylene but it will be understood that hydrogen bromide may be used in place of hydrogen chloride.

In the preferred embodiment of the invention, vinylacetylene is introduced in finely divided form in a column containing an aqueous solution of hydrogen chloride and cuprous chloride by introducing the vinylacetylene through a porous plate or sinter disk at the bottom of the column. As the finely divided vinylacetylene rises by gravity upward through the column of solution, addition products are formed. These products being of less density than the aqueous solution and practically insoluble therein, rise to the top where they form a liquid layer which can be removed in any desired way; for example, by overflowing or by syphoning. The liquid products not infrequently are mixed with unreacted vinylacetylene. This vinylacetylene may be partially removed by passing the mixture down through a column held at approximately room temperature and at sufficiently reduced pressure to vaporize the vinylacetylene and leave the addition products in the residue. This residue still contains an undesirable amount of vinylacetylene which may be removed by passing said residue in the liquid phase into a packed stripping column about midway up the packing. As it passes downward through the stripping column, a stream of gas, inert to the mixture, such as acetylene or nitrogen, passes upward in counter-current flow and removes substantially all of the remaining vinylacetylene. The removal of vinylacetylene from the reaction products by means of a stripping column is not claimed in this application but is claimed in a copending application Serial No. 169,168, filed October 15, 1937, by A. S. Carter. Reference is made to the copending application for a more complete and detailed disclosure of the removing of unreacted vinylacetylene from addition products of vinylacetylene and hydrogen chloride. After being freed of vinylacetylene, the addition products may be separated by fractional distillation. As has been previously stated, the ratio of mono- to di addition products may be controlled by a selection of the proper reaction conditions to favor a high yield of the desired product, or any desirable mixture of the mono- and di-addition products.

The following examples will serve to illustrate the manner of operating the process of the invention. It is to be understood that these examples are given by way of illustration only.

*Example I*

A vertical jacketed 22 mm. glass tube, 46 cm. long was equipped with a glass sinter disk made from 100 mesh Pyrex, sealed in at the bottom and a hydrogen chloride inlet near the disk. The upper end of the tube was closed with a stopper containing a gas outlet, a dropping funnel, a thermometer, a catalyst sampling tube and a siphon for removal of products. 50 cc. of aqueous solution containing 17.5% cuprous chloride, 19.9% hydrogen chloride and 62.6% water was added to the column. This composition was maintained throughout the operation by introduction of hydrogen chloride from a gas generator. Maintaining the operation at 25° C. by means of a thermostatically controlled jacket, vinylacetylene was blown through the sinter disk; excess vinylacetylene passing off through the gas outlet at the top. The products were continuously siphoned off of the top. Unreacted vinylacetylene mixed with the products was removed by passing the mixture through a column held at approximately room temperature and at a sufficiently reduced pressure to vaporize vinylacetylene and leave the addition products in the residue. This residue was then freed of the small amount of the remaining vinylacetylene by passing it in the liquid phase into a packed stripping column about half way up the column. As it passed downward through such column, a stream of nitrogen was passed upward in countercurrent flow through the column, removing substantially all of the remaining vinylacetylene. Analysis of the products indicated the following yields and conversions:

| Vinylacetylene input | Vinylacetylene reacted | 2-chloro-1, 3-butadiene percent yield (on C$_4$H$_4$ consumed) |
|---|---|---|
| *Gms./min.* | *Percent* | |
| 0.161 | 58.8 | 93.0 |
| 0.093 | 76.8 | 91.2 |
| 0.111 | 79.5 | 90.3 |
| 0.049 | 87.4 | 86.0 |

*Example II*

A tall narrow reaction vessel was provided with two inlets for gas at the bottom and an overflow outlet and receiver at the top. The vessel was filled nearly to the outlet with a mixture of 250 parts by weight of concentrated hydrochloric acid and 100 parts of cuprous chloride. The mixture was saturated with hydrogen chloride at 50° C. by passing gaseous hydrogen chloride into one of the gas inlet tubes. Gaseous vinylacetylene was introduced into the reaction vessel in finely divided form through a sinter disk in the other tube. The gas flow rates were adjusted so that no appreciable amount of unreacted vinylacetylene escaped at the top of the vessel. An oil rapidly accumulated on the surface of the mixture and soon began to flow continuously into the receiver. The oil was washed with water and purified by distillation. It contained a small amount of 2-chloro-1,3-butadiene but otherwise it consisted essentially of 2,4-dichloro-2-butene.

The manner of distributing vinylacetylene in finely divided form in the aqueous solution is immaterial as long as it is efficient. Thus, instead of the porous plate or sinter disk, vinylacetylene may be simply introduced into the bottom of a packed, jacketed column, the packing serving to distribute the gas. Good results may be obtained also by means of a high speed agitator, operated at a speed sufficient to distribute the vinylacetylene in small droplets or bubbles. Vinylacetylene may be introduced into the reaction zone in either the liquid or gaseous phase although in the preferred procedure, gaseous vinylacetylene is used.

If the reaction is carried out in one vessel, a slow circulation of aqueous solution will provide a uniform composition. This circulation may be internal, in which case it may be produced by gentle agitation either by the gas introduced or mechanically; or it may be external. Where an external circulation is used, the dissolved or entrained products carried through the external system is preferably a small percentage of the total products. External circulation may, for example, be carried out by slowly drawing off a portion of the solution near but below the upper level of aqueous solution and returned near the lower level of the said solution; the lines, pumps, etc., having a very small volume relative to the total volume of solution. The solubility of the products is very low and external and internal circulation have proved equally satisfactory. The reaction may be carried out in two vessels, one for dispersion and one for separation. In this case a circulation of catalyst will be established between the units through a pump if necessary. The composition of the solution will be continuously adjusted to replace the hydrogen chloride removed by reaction. A continuous or intermittent analysis of the solution should be maintained to control the introduction of gaseous hydrogen chloride from a separate source. This may be introduced into the column of aqueous solution or, if the solution is externally circulating, into the cycle, preferably ahead of the point where vinylacetylene is introduced.

Since the reaction is exothermic, it is necessary to establish a method of controlling the temperature. If the reaction is carried out in a column, it can be thermostatically jacketed to add or remove heat as necessary. If the aqueous solution is circulated through an external system, the aqueous solution may be passed through a heat interchanger and brought to a suitable temperature, or even supercooled to compensate for the heat of the reaction. The heat of absorption of hydrogen chloride in the solution is high and must also be removed to control the proper reaction.

Suitable solutions for this reaction are aqueous solutions of hydrogen chloride. The reaction is preferably carried out in the presence of any suitable catalyst, as, for example, any of the catalysts disclosed in the U. S. Patent No. 1,950,431. A preferred catalyst is cuprous chloride with or without the addition of ammonium chloride. The catalyst is usually dissolved in the aqueous hydrogen chloride solution but the presence of a small amount of solid phase is within the scope of the invention. The speed of the reaction and also the formation of di- addition products increases with increased acidity of the solution. In general, it may be said that solutions containing 15 to 38% hydrogen chloride are suitable for the purpose. The reaction will proceed very slowly in the absence of a catalyst and hence the concentration of catalyst may be varied from zero to a quantity sufficiently high to produce a small amount of solid phase. It is desirable that the amount of solid phase should not be sufficient to present mechanical difficulties of operation. While the amount of catalyst may be varied over a wide range, the concentration of catalyst is a feature in the preparation of the products in high yield. A preferred solution for forming 2-chloro-1,3-butadiene is prepared by saturating 20 to 30% hydrochloric acid with cuprous chloride at 25° C. A preferred solution for forming 2,4-dichloro-2-butene consists of 10 parts of cuprous chloride to 25 parts of concentrated (37%) hydrochloric acid. Throughout the specification and claims it has been assumed that the molecular formula for cuprous chloride is $Cu_2Cl_2$ and the proportions of materials are given on this basis. Obviously the strength of the acid solution of cuprous chloride at all times must be sufficiently concentrated to have a density greater than that of the products, in order that they may rise to the surface and be removed.

When hydrogen bromide is reacted with vinylacetylene, cuprous bromide, with or without ammonium bromide, is used as the preferred catalyst.

The reaction is generally carried out at atmospheric pressure or slightly above. If it is desirable to obtain very high yields of the mono-chloro addition product, it is necessary to take a low partial conversion per cycle. In this case, the unreacted vinylacetylene has a very high vapor pressure and it is desirable to apply pressure to maintain the resulting mixture in the liquid phase. The operating pressure must be equal to or slightly greater than the vapor pressure of the reaction products and the unreacted vinylacetylene. In general, it may be said that such pressure will fall within a range of from 1 to 3 atmospheres absolute.

Since it is desired to carry out the reaction under conditions of temperature and pressure which will maintain the reaction products in the liquid phase, the temperature must be maintained below the boiling point of the lowest boiling addition product at the operating pressure. Operation between 15 and 68° C. at atmospheric pressure is quite satisfactory. Using atmospheric pressure, the preferred range for forming 2-chloro-1,3-butadiene is 25° to 35° C. and where 2,4-dichloro-2-butene is desired as the principal product, the temperature is preferably 50° to 60° C. It is clear that as the pressure is increased an increase in temperature may also be made to produce maximum yields. In no event should the temperature be raised above that at which the vapor pressure of the products and unreacted vinylacetylene equals the pressure on the system.

Where it is desired to produce a high yield of 2-chloro-1,3-butadiene, vinylacetylene is introduced at a rate slightly greater than the reaction rate of formation of mono-addition product. Where it is desired to produce a high yield of 2,4-dichloro-2-butene, the vinylacetylene is introduced at a rate about equal to the formation of this product; i. e.: practically no unreacted vinylacetylene leaves the reaction column. Thus the conversion of vinylacetylene to hydrogen chloride addition products can be controlled to give almost any desired ratio of mono- to di- addition products.

The separation of vinylacetylene from the addition products may be accomplished by any of the usual processes of distillation, although the use of a stripping column such as previously described is preferred. The reaction products themselves may be separated by fractional distillation, preferably in a vacuum distillation system.

Suitable changes may be made in the details of the process without departing from the spirit of the invention and such changes are intended to be included within the scope of the appended claims.

We claim:

1. The process which comprises reacting vinylacetylene with a hydrogen halide of the group consisting of hydrogen chloride and hydrogen bromide by distributing vinylacetylene in finely divided form in an aqueous solution of said hydrogen halide, allowing the addition products thereby formed to rise and form a liquid layer above the hydrogen halide solution and drawing off said liquid addition products.

2. The process which comprises reacting vinylacetylene with a hydrogen halide of the group consisting of hydrogen chloride and hydrogen bromide by distributing vinylacetylene in finely divided form in an aqueous solution of said hydrogen halide in the presence of the corresponding cuprous halide, maintaining the system at a temperature below the boiling point of the lowest boiling addition product, allowing the addition products to rise by gravity and form a liquid layer above the aqueous solution, drawing off said addition products and separating said addition products from the mixture.

3. The process which comprises reacting vinylacetylene with hydrogen chloride by distributing vinylacetylene in finely divided form in an aqueous solution of hydrogen chloride, maintaining the system at a temperature below the boiling point of the lowest boiling addition product, allowing addition products to form a liquid layer above the hydrogen chloride solution, and drawing off said liquid addition products.

4. The process which comprises reacting vinylacetylene with hydrogen chloride by introducing vinylacetylene in finely divided form into an aqueous solution of hydrogen chloride in the presence of cuprous chloride, maintaining the system at a temperature below the boiling point of the lowest boiling addition product, allowing addition products to rise by gravity and form a liquid layer above the aqueous solution, drawing off the said addition products, removing unreacted vinylacetylene therefrom and separating the products.

5. The process which comprises reacting vinylacetylene with hydrogen chloride by continuously introducing gaseous vinylacetylene in finely divided form into the lower end of a column of an aqueous solution of hydrogen chloride and cuprous chloride, maintaining the column at a temperature below the boiling point of the lowest boiling addition product, maintaining the concentration of the solution by the addition of hydrogen chloride, allowing addition products thereby formed to rise by gravity and form a separate liquid layer, drawing off said products, removing unreacted vinylacetylene and separating the products by distillation.

6. The process which comprises reacting vinylacetylene with hydrogen chloride by distributing vinylacetylene in finely divided form into an aqueous solution of hydrogen chloride at a rate high enough to favor the formation of mono-addition products, allowing addition products to rise and form a liquid layer above the aqueous solution and drawing off said liquid.

7. The process which comprises reacting vinylacetylene with hydrogen chloride by continuously introducing vinylacetylene in finely divided form into an aqueous solution of hydrogen chloride at a substantial distance below the surface thereof at a rate high enough to favor the formation of mono- addition products, in the presence of cuprous chloride, at a temperature of below 60° C., allowing addition products to rise by gravity and form a liquid layer above the aqueous solution, drawing off said liquid addition products and separating 2-chloro-1,3-butadiene.

8. The process which comprises reacting vinylacetylene with hydrogen chloride by circulating an aqueous solution of hydrogen chloride and cuprous chloride through a reaction zone, maintaining said zone at a temperature of 15° to 60° C., continuously introducing vinylacetylene in finely divided form into the solution at the lower part of the reaction zone at a rate slightly greater than the rate of formation of the mono- addition products, allowing the addition products thereby formed to rise by gravity and form a liquid layer above the aqueous solution, drawing off said products, removing unreacted vinylacetylene from said products and separating 2-chloro-1,3-butadiene by distillation.

9. The process of reacting vinylacetylene with hydrogen chloride which comprises introducing vinylacetylene in finely divided form into the lower part of a column of an aqueous solution of 20 to 30% hydrogen chloride saturated with cuprous chloride at 25° C., maintaining the temperature of the reaction at 25° to 35° C., maintaining the rate of flow of acetylene favorable to the formation of 2-chloro-1,3-butadiene, allowing addition products thereby formed to rise by gravity and form a liquid layer above the aqueous solution, drawing off said products, removing unreacted vinylacetylene therefrom and separating 2-chloro-1,3-butadiene.

10. The process of reacting vinylacetylene with hydrogen chloride which comprises circulating a solution of substantially 20% hydrogen chloride, 18% cuprous chloride and 62% water through a reaction zone maintained at a temperature of 25° to 35° C., maintaining the concentration of the solution by the addition of hydrogen chloride, continuously passing gaseous vinylacetylene in finely divided form into the solution at the lower part of the reaction zone at a rate slightly higher than the rate of formation of 2-chloro-1,3-butadiene, allowing addition products thereby formed to rise by gravity and form a liquid layer above the aqueous solution, drawing off said products, drying them, removing unreacted vinylacetylene therefrom and separating 2-chloro-1,3-butadiene by fractional distillation.

11. The process which comprises reacting vinylacetylene with hydrogen chloride by distributing vinylacetylene in finely divided form in an aqueous solution of hydrogen chloride at a rate slow enough to favor the di- addition reaction, allowing addition products thereby formed to rise and form a liquid layer above the aqueous solution and drawing off said liquid.

12. The process which comprises reacting vinylacetylene with hydrogen chloride by continuously introducing vinylacetylene in finely divided form into the lower part of a solution of hydrogen chloride, in the presence of cuprous chloride, at a rate slow enough to favor the formation of di- addition products, maintaining the temperature at 15° C. to 60° C., maintaining the concentration of the solution by the addition of hydrogen chloride, allowing the addition products thereby formed to rise by gravity and form a liquid layer above the aqueous solution, drawing off said products, removing unreacted vinylacetylene therefrom and separating 2,4-dichloro-2-butene.

13. The process of reacting vinylacetylene with hydrogen chloride, which comprises circulating an aqueous solution containing 10 parts cuprous chloride to 25 parts concentrated hydrochloric acid through a reaction zone maintained at a temperature of 50° to 60° C., maintaining the concentration of the solution by the addition of hydrogen chloride, introducing gaseous vinylacetylene in finely divided form into the lower part of the solution in the reaction zone at a rate substantially equal to the rate of formation of 2,4-dichloro-2-butene, allowing addition products thereby formed to rise by gravity and form a liquid layer above the aqueous solution, drawing off said products, drying them, removing unreacted vinylacetylene therefrom and separating 2,4-dichloro-2-butene by fractional distillation.

14. In the process of reacting vinylacetylene with a hydrogen halide of the group consisting of hydrogen chloride and hydrogen bromide, the step of distributing vinylacetylene in finely divided form in an aqueous solution of said hydrogen halide.

15. In the process of reacting vinylacetylene with hydrogen chloride, the step of distributing vinylacetylene in finely divided form in an aqueous solution of hydrogen chloride in the presence of cuprous chloride.

16. In the process of reacting vinylacetylene with hydrogen chloride, the steps of distributing vinylacetylene in finely divided form in an aqueous solution of hydrogen chloride in the presence of cuprous chloride and separating the addition products formed.

WILMINGTON TRUST CO.,
By ELWYN EVANS,
 Vice-Pres.
Executor of the Estate of Wallace H. Carothers, Deceased.

ARNOLD M. COLLINS.